United States Patent [19]

Ryan et al.

[11] 4,123,140
[45] Oct. 31, 1978

[54] REFLECTING SHEETING HAVING WIDE ANGLE RESPONSE

[75] Inventors: John R. Ryan, Jackson, Miss.; Paul Shalita, Roslyn Heights, N.Y.

[73] Assignee: Ferro Corporation, Cleveland, Ohio

[21] Appl. No.: 811,945

[22] Filed: Jun. 30, 1977

[51] Int. Cl.² ............................................. G02B 5/128
[52] U.S. Cl. .................................. 350/105; 156/232; 404/12
[58] Field of Search ................ 350/104, 105, 96, 350, 350/97–103, 106; 404/12; 204/19

[56] References Cited

U.S. PATENT DOCUMENTS

| | | | |
|---|---|---|---|
| 2,326,634 | 8/1943 | Gebhard et al. | 350/105 |
| 2,713,286 | 7/1955 | Taylor | 350/105 |
| 2,948,191 | 8/1960 | Hodgson et al. | 350/105 |
| 2,977,850 | 4/1961 | Vanstrum | 350/105 |
| 3,584,932 | 6/1971 | Terrill | 350/105 |
| 3,827,783 | 8/1974 | Lemelson | 350/105 |
| 3,975,083 | 8/1976 | Rowland | 350/103 |

*Primary Examiner*—John K. Corbin
*Assistant Examiner*—B. W. de los Reyes

*Attorney, Agent, or Firm*—Milton L. Simmons; Wesley B. Taylor

[57] ABSTRACT

A reflective sheeting is disclosed having spaced apart cavities extending along one face and light-reflecting beads lining both wall and bottom portions of the cavities to impart a wide angle retroreflective response to incident light and improved brightness or intensity. The sheet is prepared by forming in a deformable carrier sheet a network of relatively depressed cavities having wall and bottom portions and spaced apart by intervening ridges, and then coating the wall and bottom portions of the cavities and the ridges with light-reflecting beads. After filling the cavities and covering the ridges with a solidified layer of a resinous organic matrix having a greater adherence to the beads than the carrier sheet has, the sheet is stripped away. This transfers the beads to the organic matrix and locates them in similarly shaped cavities and ridges molded in the matrix by the carrier sheet. Preferably, a light-transmitting face film is then secured to the matrix across the cavities to form an encapsulated reflective sheeting. In coating the corresponding wall and bottom portions of the cavities formed in the matrix with light-reflecting beads, the beads serve to impart a wide angle response and improved brightness to the sheeting.

9 Claims, 11 Drawing Figures

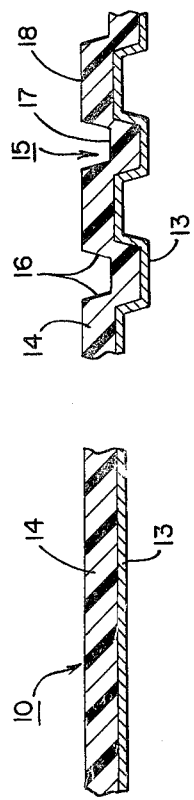
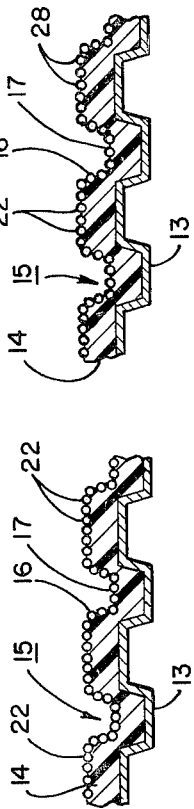
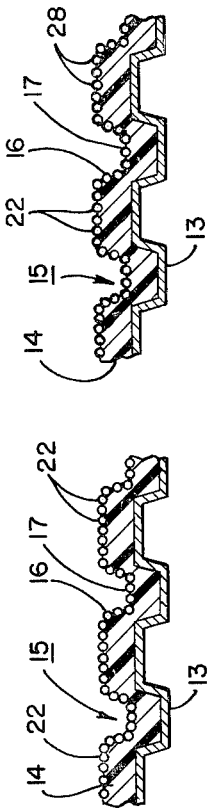
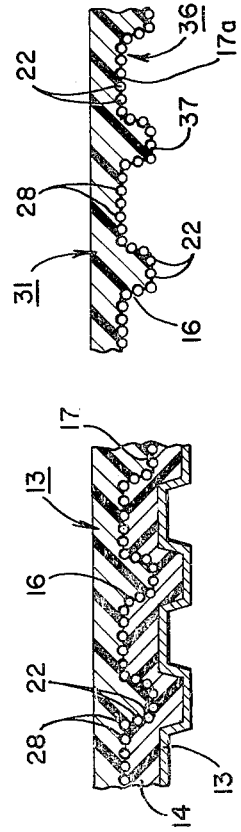
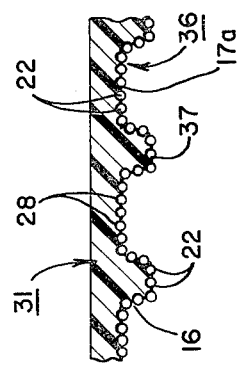
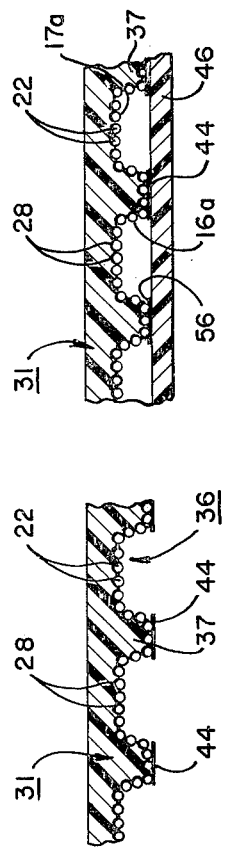
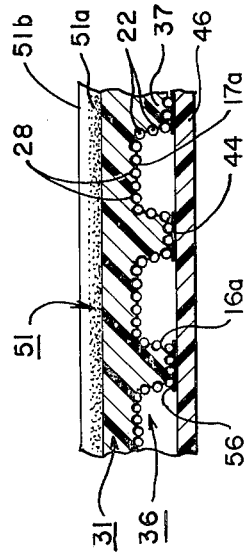
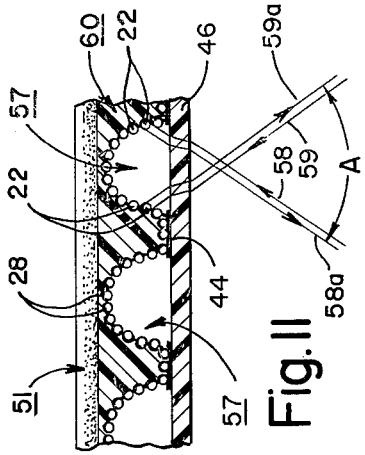

REFLECTING SHEETING HAVING WIDE ANGLE RESPONSE

BACKGROUND OF THE INVENTION

The invention relates to reflective sheeting of the type in which a light-returning layer of contiguous, small, light-reflecting beads refracts and reflects a beam or ray of incident light back toward its original source. The beads act as spherical lenses. Such sheeting is sometimes termed "reflex" or "retroreflective" to distinguish from mirrors which cause specular reflection and from diffusing surfaces which dissipate the incident light in all directions without selective return in a direction substantially parallel to the original direction of incidence. Reflective sheeting of the type described is, accordingly, able to reflect or return incident light at far greater distances than would be possible if diffused reflection occurred, and it does so without sacrifice of other desired performance characteristics. The sheeting may be cut to size and used wherever reflex or retroreflection is desired, such as for various signs and markers, for example, road signs, advertising, displays, and the like.

In the past, light-reflecting beads have been arranged in reflective sheeting in the same plane, such as is shown in U.S. Pat. No. 2,354,049 to Palmquist and in U.S. Pat. No. 2,326,634 to Gebhard et al. According to these patents, beads are partially embedded in a bonding layer which extends without interruption over a planar backing layer, so that the beads themselves are oriented in coplanar fashion, their bottom portions sitting in the bonding layer.

However, beaded surfaces which are not covered in some fashion can have their effectiveness as retroreflectors materially decreased when mud, dust, dirt, and the like eventually deposit on them. Since highway signs cannot be continually wiped clear because of maintenance costs, it becomes desirable to have a retroreflecting surface which is efficient and at the same time relatively smooth. Such a smooth surface is less conductive to dirt and dust buildup and permits rain to wash off any harmful accumulation that may occur from the retroreflecting surface.

Reflective sheeting of this type is described in U.S. Pat. No. 2,948,191 to Hodgson et al. In this case light-reflecting beads are contacted on one side by a layer of air. In particular, a thin, transparent covering film is stretched over the exposed surface, and means are provided for holding the film in a fixed position with respect to the beads and a backing material. The covering film may be attached at certain anchoring points which rise above the level of the light-reflecting beads in such a manner as to leave an air layer between the light-reflecting beads and the smooth surface created by the transparent film. The anchoring points may be supplied by spaced beads having diameters greater than the remaining light-reflective beads. Or the anchoring points may be supplied by a mesh or grid work which raises the covering film sufficiently above the beads to provide the air layer. The presence of a layer of air above the light-reflecting beads permits the use of beads at their maximum efficiency and under optimum conditions. At the same time the film used to maintain the air layer above the beads furnishes a smooth surface which remains relatively free of dirt and which is more effectively washed clean by rain and the like than if the beads were left uncovered.

A very similar arrangement is disclosed by U.S. Pat. No. 3,190,178 to McKenzie which discloses a sheeting having a layer of lens elements exposed to an interface of air and containing a plurality of hermetically isolated groups of such lens elements. McKenzie forms an intersecting grid pattern of pressure-formed, heat-sealed connections between a transparent cover film overlying the beads of the sheet material and the structure of the sheet material underlying the beads.

In such cases of a reflective sheeting having a covering or face film overlying units of light-reflecting beads separated from the film by a layer of air, the practice has been the same as for reflective sheeting of uncovered beads; namely, the beads are placed in a side-by-side, substantially coplanar relation.

SUMMARY OF THE INVENTION

The principal object of the present invention is to produce a reflective sheeting, and especially one of the covered or encapsulated type having a layer of air between beads and a face film, the sheeting having a wide angle response to incident light and improved brightness or intensity.

The present sheeting has a plurality of spaced apart cavities extending along one face thereof separated by intervening lands or ridges. The cavities have wall and bottom portion defining intersecting planes which are lined with light-reflecting beads. It is this property of the sheeting to present light-reflecting beads in a multiplicity of non-coplanar surfaces, all capable of intercepting incident light, that imparts a wide angle response and increased brightness to the sheeting. Preferably, a light-transmitting covering or face film reaches along the sheeting and across the cavities to form encapsulated cells containing an air layer substantially between the beads and the face film. For this purpose the film may be adhesively secured to the ridges between the cavities.

The present reflective sheeting is produced by a novel process in which the described cavities are initially formed in a carrier sheet which also receives and positions the light-reflecting beads. In one form, the carrier sheet serves as a throw-away mold to form similarly shaped cavities and ridges in a matrix material molded over the sheet and later transfers its beads to the cavities and ridges of the matrix when the carrier sheet is pulled away. This technique also facilitates metallization of the beads, when desired, by metallizing the exposed portions of the beads while they are fixed on the carrier sheet. When the beads are later transferred to the molded matrix as described, it is the previously exposed, metallized portions of the beads which are embedded in the matrix and which are then positioned away from the top of the cavity, a preferred positioning of the beads for optimum retroreflection.

BRIEF DESCRIPTION OF THE DRAWING

In the accompanying drawing:

FIGS. 2 through 10 are greatly enlarged, cross-sectional views of the reflective sheeting at various stages of its manufacture which correspond, respectively, with cross-sectional lines 2—2 through 10—10 of the flow diagram of FIG. 1, and FIG. 11 is a cross-sectional view of a product of the process of FIG. 1, similar to that of FIG. 10, and shows a modified form of the cavity that may be used as well as the wide angle response to incident light that is possible with the present reflective sheeting.

DESCRIPTION OF THE PREFERRED EMBODIMENTS

Figure 1:
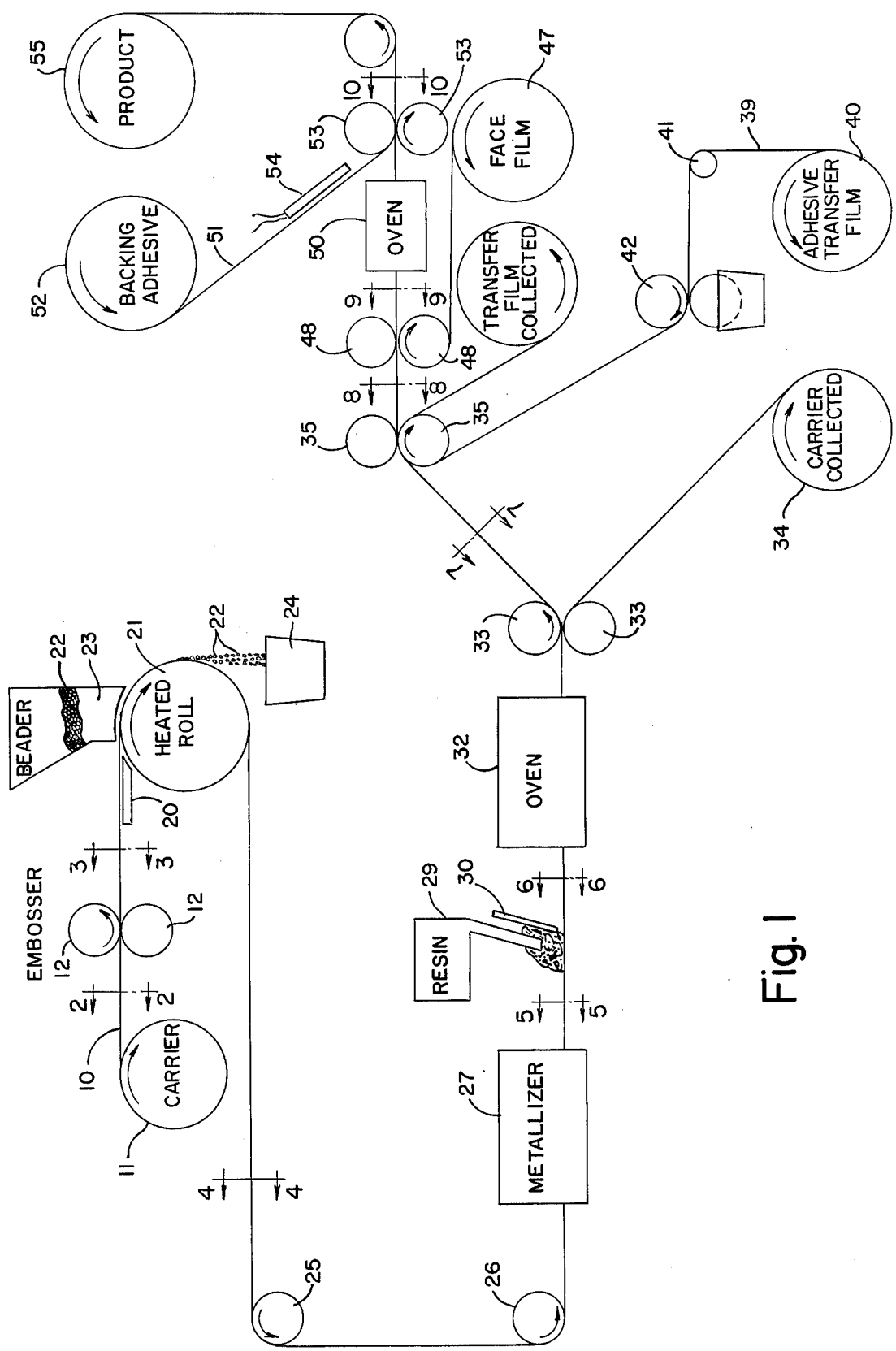
FIG. 1 is a schematic flow diagram of one form of the present process, including certain optional steps, in which the reflective sheeting is continuously produced.

As an aid in understanding the structure of the present reflective sheeting as well as delineating the steps of its fabrication, the process of preparation is initially described followed by a more detailed description of the sheeting itself.

Process

In one form, the process comprises the following steps:
1. Embossing the Carrier Sheet
2. Bead Application
3. Metallizing Beads
4. Applying Matrix Material and Setting
5. Separating Carrier Sheet and Matrix
6. Applying Adhesive
7. Applying Face Film
8. Applying Backing Adhesive Some of these steps, such as applying a backing adhesive, are not critical or even necessary. Also, these steps can be performed by hand if desired. However, FIG. 1 represents a schematic flow diagram of a continuous form of the process. A deformable carrier sheet 10 passes from a supply roll 11 through a set of matched die, male and female embossing rolls 12. The carrier sheet can comprise stiff paper, such as heavy Kraft, metal foil such as aluminum foil, or a durable, flexible plastic such as polyester terephthalate sold under the trademark "Mylar". The carrier sheet preferably is sufficiently adhesive to retain later applied beads.

This can be accomplished by applying an adhesive to the side of the carrier sheeting which receives the male embossing member. Preferably, the carrier sheet 10 (FIG. 2) comprises a support 13, which can be paper, resinous layer, or metal foil, having a coherent, continuous thermoplastic film or coating 14. Many thermoplastic resinous organic materials can be used for film 14, such as polyethylene, polypropylene, polyacrylic acid, polyacrylic acid esters, polymethacrylic acid, polymethacrylic acid esters, various polyvinyl resins such as polyvinyl acetate, polyvinyl butyral, polyvinyl chloride and polyvinyl fluoride, cellulose acetate, polystyrene, nylon (polyamides), and the like. Application of such resinous materials to the carrier backing can be carried out by known means. While sizes are not critical, in one instance a film of polyethylene measuring three mils in thickness was laminated to aluminum foil measuring 0.5 mil in thickness.

The embossing step produces in the thermoplastic film a network of relatively depressed cavities generally indicated at 15 (FIG. 3) having wall portions 16 and bottom portions 17 and spaced apart by ridges or lands 18 which remain from non-upset areas of the carrier sheet. The shape of a cavity 15 is not critical other than it be defined by non-planar surfaces. Each of the wall and bottom portions 16 and 17, respectively, can selectively be flat or curved. Thus a cavity 15 may be a frustum of a cone or of a pyramid, or semi-spherical, or have still other compound shape. A preferred pattern for a cavity is a square bottom portion ⅛ inch on a side, a depth of about 8 mils, and a ridge width of about 10 mils. Ridges 18 between cavities 15 are necessary, since the ridges and cavities of carrier sheet 10 form, respectively, the cavities and ridges of the matrix material, as hereinafter more fully described. The carrier sheet as represented by FIG. 3 is really a throw-away mold by which the reflective sheeting is formed.

Light-reflecting beads are next applied in a manner to coat the wall and bottom portions 16 and 17 of the cavities and ridges 18 as well. Such beads are preferably glass beads and are well known in the art for this purpose. However, any suitable hard, transparent, solid material can be used having a desired index of refraction and size. Beads are usually selected for clarity, cleanliness and size. In general, the beads may have a diameter of about 1 mil to about 10 mils and an index of refraction of about 1.50 to about 3.0. Preferably, however, glass beads are used having a diameter of about 2 mils to about 6 mils; and since the manufacture of glass having a refractive index of 2 or more is expensive; more often the refractive index for glass beads may range from about 1.60 to about 2.00.

The thermoplastic film 14 of the deformable carrier sheet, which is to serve ultimately as a release film, is heated prior to receipt of the beads. This may be accomplished by a standard electric hot plate 20 place in proximity to a driven applicator roll 21, or roll 21 itself may be internally heated by means known in the art, for example, by steam. In either case, film 14 is heated to a point where it is viscous or semi-fluid and readily receives and adheres to beads 22 falling at a controllable rate by gravity from a hopper 23 onto the embossed carrier sheet 10 as it rounds roll 21. The beads may extend about 40% to about 50% of their diameter into film 14 whose temperature and time of heating may be controlled and interrelated to achieve a desired penetration by the beads. As an example, a deformable carrier sheet having a polyethylene film was heated at about 285° F. for about 100 seconds to about 150 seconds. This produced a closely packed bead layer. The excess of beads 22 falls from the carrier sheet as it rounds roll 21 and collects in a receptacle 24. At this stage of the process (FIG. 4), all or most all of the carrier sheet becomes coated with beads 22, including both wall and bottom portions of cavities 15 and ridges 18 as well. It will be appreciated that although in FIGS. 2 through 11 beads are shown as arranged in rows, in normal practice the beads are in packed relation extending over the described areas.

In the preferred practice of the process, the exposed portions of beads 22 now anchored in thermoplastic film 14 are coated with a reflective metal. This appreciably increases the reflectance of the ultimately produced reflective sheeting. Any bright metal can be used including alloys, such as silver and its alloys, but aluminum is quite effective and much less expensive. The metal can be painted on as from a suitable suspension, but it is preferred to vaporize the metal onto the beads by techniques known in the art, such as those techniques used to silver mirrors. Aluminum-coated glass beads are described in U.S. Pat. No. 2,963,378 to Palmquist et al and U.S. Pat. No. 3,535,019 to Louglet et al, the disclosures of which are hereby incorporated by reference.

Reverting to FIG. 1, carrier sheet 10, now beaded, passes around directional rolls 25 and 26 and into a metallizing chamber indicated at 27. This chamber is evacuated, for example, to about $10^{-5}$ Torr while aluminum metal is electrically melted, vaporized, and deposited on exposed portions of beads 22 as a metallic covering 28 (FIG. 5).

The process steps to this point, excepting the addition of beads 22, are merely to fabricate a suitable mold over which the reflective sheeting is actually cast. After the metallization, an organic resinous material is applied over the embossed, beaded carrier sheet so as not only to fill cavities 15 but to cover ridges 18 as well. In the illustrated form of the process, this is accomplished by flowing the organic resinous material from a supply thereof represented at 29 onto the carrier sheet and then by means of a doctor knife 30 leveling the resinous material to leave a matrix 31 (FIG. 6) which extends above the ridges or lands 18 a distance which determines the thickness of the base of the reflective sheeting ultimately formed, for example, about 3 to 8 mils.

The resinous organic matrix material can be any suitable, processable material as long as it has a greater adherence to beads 22 than thermoplastic film 14 does. This depends on the materials used for matrix 31 and film 14, respectively, but it is easily determined by simple trial and error. The resinous organic material can be thermoplastic but it is preferably cross-linking or otherwise thermosetting to prvide greater strength and stability. When the material is thermoplastic, it may comprise any of those materials previously described for the thermoplastic film 14, care being taken to ensure greater bead adherence to the chosen matrix material than to the film. When the resinous organic material is thermosetting, it is applied in an uncured or partially cured state and may be epoxy resins, cross-linked polyesters, the aldehyde resins, such as phenol-formaldehyde, urea-formaldehyde, melamine-formaldehyde, phenol-furfural, and the like. When a thermosetting resin is used for the matrix, the assembly is passed through an oven, such as is indicated at 32, to cure the resin. Temperatures and time of cure for the resins indicated are known in the art.

Although thermosetting resins are normally cured by heat, in some cases a tacky, semi-sticky condition prevails on the cured thermoset which can remain for extended periods of time and which can interfer with subsequent processing steps. The presence of oxygen appears to inhibit final cure of the resin. In the present case, the tacky condition is preferably avoided by using as the matrix material a resin which is curable under energy radiation, such as ultraviolet light, electron beam radiation, and the like. Resinous materials suitable for this purpose are known in the art as well as the use of free-radical catalysts which are often incorporated in the materials to initiate or further polymerization to a final cure. An example of an ultraviolet-responsive material is an acrylic-urethane copolymer in which cross-linking occurs when the material is subjected to ultraviolet radiation. In general, olefinic resins can be cured by ultraviolet radiation. For example, other radiation curable resins include unsaturated polyesters and acrylated epoxy resins. A specific example of the latter is the diacrylic acid ester of a diglycidal ether of bis-phenol A.

When an ultraviolet curable resin is used for matrix 31, oven 32 comprises an ultraviolet radiation apparatus which is known in the art and obtainable on the open market. In one instance, an ultraviolet curable matrix material was exposed to ultraviolet lamps for about 3 seconds to about 10 seconds.

If desired, matrix 31 may contain a sufficient amount of a coloring pigment mixed with it prior to the time the matrix material is applied from supply 29 to make those areas of matrix which are not covered by beads 22 light reflective at least during day-light hours. Known pigments such as titania, zinc sulfide, lead chrome, and the like may be used.

Following the casting and molding of the matrix material, the carrier sheet, having performed its purpose, is separated from the resulting matrix. In FIG. 1 the assembly exiting from the oven or ultraviolet radiator 32 passes between cooperating rolls 33. The carrier sheet is stripped away and collected on driven roll 34, while matrix 31 continues on between cooperating pressure rolls 35. FIG. 7 illustrates the structure of the reflective sheeting at this stage which is that of an open face reflector. Matrix 31 which will form the backing of the sheeting has cavities separated by ridges matching those of the deformed carrier sheet. However, ridges 18 of the carrier sheet form cavities 36 in the matrix, and cavities 15 of the carrier form ridges 37 in the matrix. Cavities 36 have wall portions 16a and bottom portions 17a corresponding to those of cavities 15.

Because beads 22 have greater adherence to matrix 31 than to the material of thermoplastic film 14, the beads transfer to the former. If matrix 31 contains a white or other coloring pigment, some of this shows between the beads. Also, since the exposed portions of beads 22 were metallized when they were embedded in thermoplastic film 14 and the beads are bodily transferred, the metallized coverings are at the rear of the beads (FIG. 7). This is necessary in order for such coverings to enhance the reflectivity of the beads, since upon striking a bead, light is refracted to the rear thereof, reflected off the metallized covering, and then retrodirected away from the rear toward the front of the bead and ultimately back toward its source.

In order to facilitate the release of beads 22 from film 14, it is within the contemplation of the invention to coat the beads with a release agent. This may be done by tumbling the beads with a release agent prior to the time the beads are charged to hopper 23. Known release agents may be used such as silicone oils. Any amount of silicone oil added is of some value and preferably enough of the release agent is used to cover the beads completely. In one instance, silicone oil sold by General Electric under the trade designation, SM-70, was applied to the beads as 2.61 grams of a 1.25% aqueous solution of the silicone per pound of beads. After application of the oil, the beads were dried at 350° F. for 1.5 hours prior to being charged as from hopper 23.

While the open face reflector as represented by FIG. 7 is useful in this form, it is preferred to close the cavities and produce an encapsulated reflective sheeting having a captured air layer over the beads. For this purpose, a light-transmitting face film may be secured to the matrix across cavities 36 to form an encapsulated reflective sheeting. Additionally, although not necessarily, a backing adhesive may also be applied to a side of the reflective sheeting opposite to that having the face film, so that the reflective sheeting may be secured in use to a functional site.

A face film is preferably adhesively secured to the structure of FIG. 7. While it is possible to apply an adhesive directly to the face film itself and then to adhere the film to matrix 31 across cavities 36, this has the disadvantage of reducing reflectance due to a thin layer of adhesive which extends entirely across the underside of the face film. It is estimated that when a face film is entirely covered with an adhesive, there is at least a 10% loss of brightness by the double transmission of light through the face film, that is, in passing through the film to reach the beads and then in passing out through the film after reflection.

In the present case, ridges 37 of matrix 31 provide selective anchoring points for the face film and preferably only these areas are adhesively coated. The face film itself never receives an adhesive until it is pressed against matrix 31 and then only at areas overlying and contacting ridges 37. The balance of the underside of the face film is adhesive-free.

For example, referring to FIG. 1, an adhesive-transfer plastic film 39 passes from a supply roll 40 around idler roll 41 and between adhesive-applying, cooperating rolls 42, the lower of which is mounted for rotation in a reservoir 43 of adhesive. The latter may be any of the adhesives, glues, and the like known in the art. The adhesive may be either thermoplastic or thermosetting. If thermoplastic, preferably the adhesive dries quickly (less than 2 minutes) at room temperature, but air cooling can be used if desired. If the adhesive is thermosetting, any of the previously disclosed thermosetting resins can be used and applied in an uncured or partially cure state. If a solvent or dispersant is present, the assembly may be warmed by means not shown to hasten the evaporation of liquids. Moisture cure polyurethanes have been found useful as the adhesive as well as epoxy resins and elastomers like butadiene-styrene copolymers. Many other adhesives, both synthetic and naturally occurring, can be used, such as glue, asphalt, and the like.

After picking up a layer of adhesive by passing between rolls 42, adhesive-transfer film 39 is forced into contact with matrix 31 as the two jointly pass between cooperating rolls 35. Matrix 31 and adhesive-transfer film are so positioned with respect to each other that the adhesive layer of the film is pressed against ridges 37 of matrix 31. There is, therefore, only a "kiss" application of the adhesive solely on ridges 37 as represented at 44 in FIG. 8. The adhesive-transfer film 39 is immediately withdrawn from contact with matrix 31 and collected on a driven roll 45. Since ridges 37 are the only parts of matrix 31 to contact adhesive-transfer film 39, they are the only parts to receive adhesive.

Following the application of adhesive 44, a face film 46 advances from a supply roll 47 and between cooperating pressure rolls 48 which adhere film 46 to the adhesively coated ridges 37 of the matrix. Where, as preferred, adhesive 44 is thermosetting, the assembly is passed through an oven 50 to advance the adhesive to final stage of cure. Before this the green strength of the adhesive is used to hold face film 46 in place. The temperatures of cure depend on the materials being used but as an example may range from about 120° F. to 160° F. and higher.

Face film 46 must be light-transmitting and can comprise any film-forming material. Normally, plastic films are used and can comprise, for instance, any of the resinous materials described for thermoplastic film 14. Films of the polyacrylates, polyesters, polycarbonates, and polyvinyls such as polyvinyl fluoride have been found to be especially useful. Thicknesses of the face film may range, as an example, from about 1 mil to about 10 mils and preferably from about 1 mil to about 3 mils. The face film can be pigmented, if desired, to impart a pleasing color as long as its light-transmission is not seriously adversely affected.

In a preferred practice, adhesive 44 and face film 46 as well may comprise a resin of the cross-linking type such as cross-linking polyester, cross-linking polyurethanes, and the like. Where both are cross-linking there may be interreaction on final cure as in oven 50. In either case, there is greater heat stability during use and an inherently stronger face film.

Although a backing adhesive is not essential, it is often useful for securing the reflective sheeting at a point of use, for example, to a suitable support where the sheeting is to serve as a road sign or the like. Any adhesive material can be used for this purpose, but pressure-sensitive adhesives are preferred because their facile use. In FIG. 1, a backing adhesive layer 51 advances from a supply roll 52 between cooperating pressure rolls 53 where, by virtue of its adhesiveness, layer 51 is laminated to the reflective sheeting. FIG. 10 illustrates the resulting structure in which layer 51 adheres to a side of the reflective sheeting opposite to that having face film 46. Adhesive layer 51 itself may comprise two delaminating layers, one 51a constituting the pressure-sensitive adhesive, and layer 51b constituting a releasable, non-adhesive layer. When it is desired to secure the reflective sheeting to a given support, layer 51b is peeled off and layer 51a stuck to the suppport.

Heat actuated adhesives may also be used for this purpose, and in this event an electric heating plate 54 may be stationed near backing adhesive layer 51 prior to its reaching rolls 53. In either case, the final product is collected on a driven roll 55.

The reflective sheeting, therefore, is conveniently manufactured in continuous form and can be supplied in rolls of any reasonable width and length. This reduces manufacturing costs and facilitates shipping and storage, since a user may cut shapes of a wide variety of sizes as may be desired from a stock roll.

Structure

The present retroreflector comprises a sheeting, as defined by a resinous organic matrix 31, having a wide angle response obtained from spaced apart cavities 36 extending along one face and light-reflecting beads 22 lining wall portions 16a and bottom portions 17a of the cavities. Preferably, cavities 36 are spaced apart by ridges 37, and a light-transmitting face film 46 reaches along that side of the sheeting and is adhered to ridges 37 to seal off cavities 36 and form an encapsulated type of retroreflector in which a captive layer of air lies between beads 22 and face film 46.

As shown in FIGS. 9 and 10, the perimeters 56 of the openings of cavities 36 are adjacent to face film 46 and light-reflecting beads 22 line wall and bottom portions of the cavities and extend substantially from points near the face film to the bottoms of cavities 36 to intercept and reflect incident light directed toward the sheeting through angles widely divergent from the normal to the sheeting. Preferably, portions of beads 22 which face away from cavities 36 are coated with a reflective metal 28. If desired, the sheeting may have a backing adhesive layer 51 on a side opposite to that having face film 46.

It will be understood that many other structures may be employed for backing adhesive layer 51 than the one illustrated. For example, the layer may comprise a sandwich construction of several superimposed layers, such as a first pressure sensitive adhesive layer which adheres itself to the reflective sheeting, a reinforcing plastic film such as of polyester terephthalate over the adhesive layer, a second pressure-sensitive adhesive layer over the plastic film, and finally a release liner such as of polyethylene over the second adhesive layer, all of such layers being adhered together as one sandwich package.

As indicated, the shape of a cavity 36 in the sheeting is not critical as long as it is defined by non-planar surfaces. FIG. 11 illustrates a modified form of a cavity that may be used as well as the wide angle response to incident light that is possible with either embodiment of the present reflective sheeting. Similar parts have been represented by the same reference numbers, but it will be noted that cavities 57 of a matrix 60 are semi-spherical in lieu of the more flat sides and flat bottoms of cavities 36. Combinations of planocurved sides may also be used.

In FIG. 11, 58 represents an incident beam of light approaching the reflective sheeting. It is refracted by face film 46, strikes beads 22 near the right hand portion of a cavity, as viewed in FIG. 11, and is then retroreflected as beam 58a displaced from beam 58 for purpose of illustration. Similarly, the embodiment of FIG. 11 is capable of intercepting an incident beam of light 59 which is refracted by face film 46 onto beads 22 along the left hand side of FIG. 11, and is then retroreflected as beam 59a. Thus each cavity of the reflective sheeting is capable of a wide angle response as represented, for example, by angle A.

Although the foregoing describes several embodiments of the present invention, it is understood that the invention may be practice in still other forms within the scope of the following claims:

We claim:

1. An encapsulated retroreflector having a wide angle response comprising sheeting having cavities of substantially uniform sizes and dimensions extending along one face thereof spaced apart by substantially flat ridges, said cavities having wall and bottom portions, light-reflecting beads partially embedded in said wall and bottom portions of the cavities of said sheeting, the embedded parts of said beads being coated with a reflective metal, adhesive means on said substantially flat ridges, a light-transmitting face film extending along said one face secured to said ridges by said adhesive means and serving to seal off said cavities, the perimeters of the openings of the cavities being adjacent to said face film, said beads extending substantially from points near said face film along and across said wall and bottom portions of the cavities and in cooperation with said uniform sizes and dimensions of the cavities serving to intercept and reflect incident light directed toward said sheeting through angles widely divergent from the normal thereto.

2. A retroreflective sheeting of claim 1, in which said sheeting comprises a resinous organic material.

3. The retroreflective sheeting of claim 1 in which said sheeting comprises a thermoset resinous organic material.

4. The retroreflective sheeting of claim 1 in which said beads are glass having a diameter from about 1 mil to about 10 mils and an index of refraction from about 1.50 to about 3.00.

5. The retroreflective sheeting of claim 1 in which said sheeting has a backing adhesive on a side opposed to that having the face film.

6. The retroreflective sheeting of claim 1 in which said sheeting contains a coloring pigment to make light-reflecting those surface portions of the sheeting not covered by said light-reflecting beads.

7. The retroreflective sheeting of claim 1 in which said adhesive means is a cross-linking resin.

8. The retroreflector sheeting of claim 1 in which said beads extend across the ridges as well.

9. The retroreflective sheeting of claim 1 in which said bottom portions of the cavities are of sufficient size and dimensions to form flat bottom portions substantially parallel to said flat ridges.

* * * * *